United States Patent
Ising et al.

(10) Patent No.: US 12,534,150 B2
(45) Date of Patent: Jan. 27, 2026

(54) MOTORCYCLE WITH A SEAT ARRANGEMENT

(71) Applicant: Bayerische Motoren Werke Aktiengesellschaft, Munich (DE)

(72) Inventors: Christian Ising, Munich (DE); Dieter Strasser, Oberhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 168 days.

(21) Appl. No.: 18/569,630

(22) PCT Filed: Jul. 14, 2022

(86) PCT No.: PCT/EP2022/069729
§ 371 (c)(1),
(2) Date: Dec. 13, 2023

(87) PCT Pub. No.: WO2023/016743
PCT Pub. Date: Feb. 16, 2023

(65) Prior Publication Data
US 2024/0286696 A1    Aug. 29, 2024

(30) Foreign Application Priority Data
Aug. 12, 2021   (DE) ..................... 10 2021 121 006.2

(51) Int. Cl.
*B62J 33/00*    (2006.01)
*B62J 1/12*     (2006.01)
(Continued)

(52) U.S. Cl.
CPC ............. *B62J 33/00* (2013.01); *B62J 1/12* (2013.01); *H02J 50/10* (2016.02); *H01R 13/447* (2013.01); *H01R 2201/26* (2013.01)

(58) Field of Classification Search
CPC ........... B62J 33/00; B62J 1/12; H01R 13/447; H01R 2201/26
(Continued)

(56) References Cited

U.S. PATENT DOCUMENTS

| 6,761,399 B2 * | 7/2004 | Bargheer | B60N 2/5635 |
|---|---|---|---|
|  |  |  | 297/180.12 |
| 7,178,866 B1 * | 2/2007 | Scott | B62J 1/12 |
|  |  |  | 297/180.12 |

(Continued)

FOREIGN PATENT DOCUMENTS

| DE | 10 2004 034 675 A1 | 2/2006 |
|---|---|---|
| JP | 2010-58674 A | 3/2010 |

OTHER PUBLICATIONS

International Search Report (PCT/ISA/210) issued in PCT Application No. PCT/EP2022/069729 dated Oct. 24, 2022 with English translation (4 pages).
(Continued)

*Primary Examiner* — Jose V Chen
(74) *Attorney, Agent, or Firm* — Crowell & Moring LLP

(57) ABSTRACT

A motorcycle has a seat arrangement that can be entirely or at least partially detached from the motorcycle. The seat arrangement forms a sitting surface for a user and has an electrically operable device. In order to be supplied with electrical power, the electrically operable device is connected to a power transmission device which has a first line section which is associated with a vehicle structure and is coupled to a power source, and a second line section which is associated with the seat arrangement and is electrically conductively connected to the electrically operable device. The power transmission device is designed in such a way that, by way of arranging the seat arrangement in an operating position, the first line section and the second line section are positioned in a transmission position in relation (Continued)

to one another, which transmission position is designed for transmitting the electrical power.

8 Claims, 4 Drawing Sheets

(51) Int. Cl.
*H02J 50/10* (2016.01)
*H01R 13/447* (2006.01)

(58) Field of Classification Search
USPC .................................................. 297/180.12
See application file for complete search history.

(56) References Cited

U.S. PATENT DOCUMENTS

| | | | | |
|---|---|---|---|---|
| 10,793,218 | B1* | 10/2020 | Hanagan | ............... B62J 1/12 |
| 2004/0239088 | A1 | 12/2004 | Rondeau et al. | |
| 2013/0097777 | A1* | 4/2013 | Marquette | ........... B60N 2/5621 |
| | | | | 297/180.12 |
| 2013/0106147 | A1* | 5/2013 | Lazanja | .................. H05B 3/36 |
| | | | | 297/180.12 |
| 2015/0054317 | A1* | 2/2015 | Fortune | ................ B60N 2/5685 |
| | | | | 297/180.12 |
| 2017/0267060 | A1* | 9/2017 | Majoros | .................... B62J 33/00 |
| 2018/0304949 | A1* | 10/2018 | Ingram | ................ B60N 2/5685 |
| 2019/0061574 | A1* | 2/2019 | Schwintek | ........... B60N 2/5657 |
| 2023/0157384 | A1* | 5/2023 | Bessette | .................... B62J 33/00 |
| | | | | 236/1 C |
| 2023/0257048 | A1* | 8/2023 | Perreten | .................... B62J 1/007 |
| | | | | 297/180.12 |
| 2024/0101213 | A1* | 3/2024 | Summons | ................ B62J 45/00 |
| 2024/0124083 | A1* | 4/2024 | Takahashi | ............ B60N 2/5685 |
| 2025/0136216 | A1* | 5/2025 | Chiba | ..................... B68G 7/05 |

OTHER PUBLICATIONS

German-language Written Opinion (PCT/ISA/237) issued in PCT Application No. PCT/EP2022/069729 dated Oct. 24, 2022 with English translation (7 pages).

German-language Search Report issued in German Application No. 10 2021 121 006.2 dated Apr. 26, 2022 with partial English translation (10 pages)

\* cited by examiner

MOTORCYCLE WITH A SEAT ARRANGEMENT

BACKGROUND

Summary

The invention relates to a motorcycle having a seat arrangement which is completely or at least partially detachable from the motorcycle.

Motorcycles, such as motorbikes or motor scooters, usually have a seat arrangement which forms a seat surface for one or more users. To this end, the seat arrangements are in the form of either an individual seat for use by one person per seat or a bench seat for use by multiple users.

To increase comfort, seat arrangements having for example an electrically operable seat heater and/or an electrically operable seat ventilator are known.

Power is supplied to these electric devices always via power cables, which run between each electric device integrated in the seat arrangement and a power source in the vehicle. The power cables may also be part of a cable harness of the motorcycle.

If the seat arrangement is to be opened or completely removed from the motorcycle, the user always has to be careful to avoid damage to the power cable. To this end, it is usually necessary to manually dismount the power cable, for example by detaching an intermediate connecting plug. If the power cable or the connecting plug is not detached or is not completely detached, at least the power cable can be damaged. However, damage to the respective electric device also cannot be ruled out, this possibly meaning complete failure and entailing a full exchange of the entire seat arrangement.

If the seat arrangement is to be (re-)mounted or closed, the power supply must be mounted anew each time, for example by mounting the power cable or by plugging in the connecting plug. If this is forgotten, the corresponding function is not available.

In any case, the detachment and plugging in of the connecting plug is usually uncomfortable, since the installation space is limited and therefore use is not normally made of plugs which are fastened to the underside of the seat arrangement, in particular to the underside of a seat pan, and can be manually actuated only with difficulty. Frequent plugging in and unplugging can furthermore lead to premature failure of the connecting plug.

An object of the invention is to further develop such a seat arrangement for a motorcycle in an advantageous way. In particular, simplified mounting and dismounting of the seat arrangement should be enabled even in the case of an integrated electrical consumer.

This object is achieved by a motorcycle according to the subject matter of the independent claims. Advantageous embodiments will emerge from the dependent claims.

Accordingly, what is provided is a motorcycle having a seat arrangement which is completely or at least partially detachable from the motorcycle, wherein the seat arrangement forms a seat surface for a user and has an electrically operable device, wherein the electrically operable device is connected to an energy transmission device in order to be supplied with electrical energy.

The energy transmission device comprises:
a. a first line section, which is assigned to a vehicle structure and is coupled to an energy source, and
b. a second line section, which is assigned to the seat arrangement and is electrically conductively connected to the electrically operable device.

In addition, the energy transmission device is designed such that the first line section and the second line section are positioned in a transmission position, designed for electrical energy transmission, in relation to one another by means of arranging the seat arrangement in an operating position.

The seat arrangement may be, for example, in the form of one or multiple individual seats each for use by a person or a bench seat for use by multiple users. The seat arrangement is arranged on the motorcycle such that it can be partially detached from the motorcycle as required. This can be done for example by a swinging-open movement of the seat arrangement relative to the vehicle structure of the motorcycle. The seat arrangement may here be moved from a closed position, that is to say the "operating position" intended for use of the motorcycle, into a swung-open position, in which for example a stowage compartment arranged underneath the seat arrangement is accessible.

As an alternative, the seat arrangement may, however, also be completely detached from the tilting vehicle by taking the seat arrangement fastened to the motorcycle off of the motorcycle and removing the seat arrangement.

In any case, the seat arrangement described comprises the electrically operable device. The latter is for example integrated in or provided on the seat arrangement and constitutes an electrically operable consumer which must be supplied with electrical energy, in particular with electrical current, in order to operate.

To this end, the motorcycle comprises the energy transmission device, which has at least the two sections described: (i) the first line section and (ii) the second line section. Of course, other line sections may also be provided.

In any case, the first line section is electrically conductively connected to the energy source, for example by a current-conducting cable. Moreover, the first line section may be arranged on a surface of the vehicle structure or be integrated in the vehicle structure. In this case, the first line section may preferably be positioned underneath the seat arrangement. Moreover, the first line section may be part of a cable harness. Likewise with preference, the first line section is preferably mounted fixed to the vehicle.

The second line section is—as described—assigned to the seat arrangement and can to this end be integrated in or arranged on the seat arrangement. The second line section may also be arranged in fixed fashion, that is to say in this case fixedly fastened to or in the seat arrangement.

In any case, the second line section is intended to provide an electrical current for operating the electrically operable device. To this end, the second line section may be electrically conductively connected to the electrically operable device, for example by a current-conducting cable.

In order to be able to provide straightforward detachability of the seat arrangement, there is no permanently wired connection for electrical energy transmission between the first line section and the second line section. A continuous power cable or a plug-in connection which is to be connected manually is thus omitted.

Instead, the energy transmission device described is designed such that solely the arrangement of the seat arrangement in its operating position suffices to enable transmission of electrical energy. In the process, the two line sections are moved into the transmission position, in which electrical energy transmission is possible.

Depending on the configuration of the energy transmission device, which will be described in detail below, the transmission position is defined such that the first line section and the second line section in the transmission position are arranged at least adjacent to one another or are brought into direct electrically conductive contact with one another for the purpose of electrical energy transmission. This means that the first line section and the second line section are arranged at mutually facing positions of the vehicle structure and the seat arrangement when the seat arrangement is in the operating position and thus the two line portions are in the transmission position.

A plug-in connection or cable connection between two sections is avoided in this way.

However, this configuration also means that detaching the seat arrangement from the vehicle interrupts the ability to transmit electrical energy, since the second line section is moved away from the first line section and thus removed from the transmission position by the partial or complete detachment of the seat arrangement.

Motorcycles are to be understood to mean in particular tilting vehicles or single-track vehicles, such as motorbikes or motor scooters, but also quad bikes or trikes.

For example, the electrically operable device may comprise a heating device for heating the seat surface and/or a ventilating device for ventilating the seat surface and/or a cooling device for cooling the seat surface. Of course, it is additionally or alternatively possible for the electrically operable device to comprise other electrical consumers, such as an electrically operable seat adjuster, an electrically operable massaging device, an electrically operable vibration transmitter for tactile signal generation, and many others.

According to one embodiment, the first line section and the second line section may be electrically conductively and detachably connected to one another in the transmission position. To this end, the first line section may be in electrically conductive contact or brought into contact with the second line section in detachable fashion, for example by placing the second line section on and/or loosely applying it. In any case, an electrical current can be provided via the first line section and conducted to the electrically operable device via the second line section in order to operate the electrically operable device.

For example, the first electric line section may have at least one contact surface and the second electric line section may have at least one second contact surface, wherein arranging the seat arrangement in the operating position causes the at least one first contact surface to electrically contact the at least one second contact surface. In this configuration, the respective contact surfaces in this way are brought into detachable contact with one another or a detachable application, which can be selectively detached or established solely by moving the seat arrangement, is provided.

Accordingly, in this case, the at least one first contact surface and the at least one second contact surface may be arranged and fastened at mutually facing positions of the vehicle structure and of the seat arrangement.

If the seat arrangement is brought into the operating position from a detached or at least partially detached position, the one or more contact surfaces of the first line section are brought into contact with one or more corresponding contact surfaces of the second line section in order to provide electrical current conduction and thus electrical energy transmission to operate the device.

For example, the at least one first contact surface and/or the at least one second contact surface have a movable design and are pretensioned by a spring element, in order to subject the respective other contact surface to load. To this end, the respective contact surface may be part of a respective contact element which is fastened fixedly (directly or indirectly) to the vehicle structure or the seat arrangement by means of a mount and is movable in translation and/or in rotation and/or in elastic deformation with respect to this mount.

Furthermore, the motorcycle may comprise a movable cover which partially or completely covers the at least one first contact surface when the seat arrangement is in a position detached from the motorcycle and, when the seat arrangement is being arranged in the operating position, is moved in such a way that the movable cover exposes the at least one first contact surface.

In this way, the at least one first contact surface is covered in the unused state, which makes it possible to rule out inadvertent contact-connection and the possible risk of a short circuit.

For example, the movable cover may be a cover plate or a sliding device.

As an alternative or in addition to the movable cover, at least the at least one first contact surface may be arranged recessed or have a recessable design with respect to a surrounding edge. In this way, it is also possible to (additionally) avoid inadvertent contact-connection.

According to a further embodiment, the first line section and the second line section in the transmission position may be operatively coupled by means of induction for electrical energy transmission.

This means that a direct electrically conductive contact-connection is not established between the first line section and the second line section. Instead, the two line sections are arranged adjacently but without direct electrical contact in relation to one another, so that a current flow in the second line section is generated by means of induction, the current flow enabling the operation of the electrically operable device. To this end, the first line section may generate a varying magnetic field which generates an electrical current in the adjacently arranged second line section.

Preferably, to this end the first line section and the second line section may each comprise a conductor loop or a conductor coil for electrical energy transmission by means of induction. For the adjacent arrangement of the respective conductor loop or conductor coil, it may be provided in or at a first position of the vehicle structure facing the seat arrangement. Accordingly, the respective conductor loop or conductor coil of the second line section is provided in or at a second position, facing the first position and arranged adjoining (or at least adjacent to) the latter, of the seat arrangement, preferably in or on an underside of a seat pan of the seat arrangement.

In any case, electrical energy transmission without a plug is thus provided between the vehicle and the bench seat, either by virtue of fixedly provided electrical contacts or contact surfaces which are brought into detachable contact with one another, or via an inductive coupling between the motorcycle and its seat arrangement.

The invention will be explained in more detail below on the basis of an exemplary embodiment and with reference to the drawings.

DETAILED DESCRIPTION OF THE DRAWINGS

Figure 1:
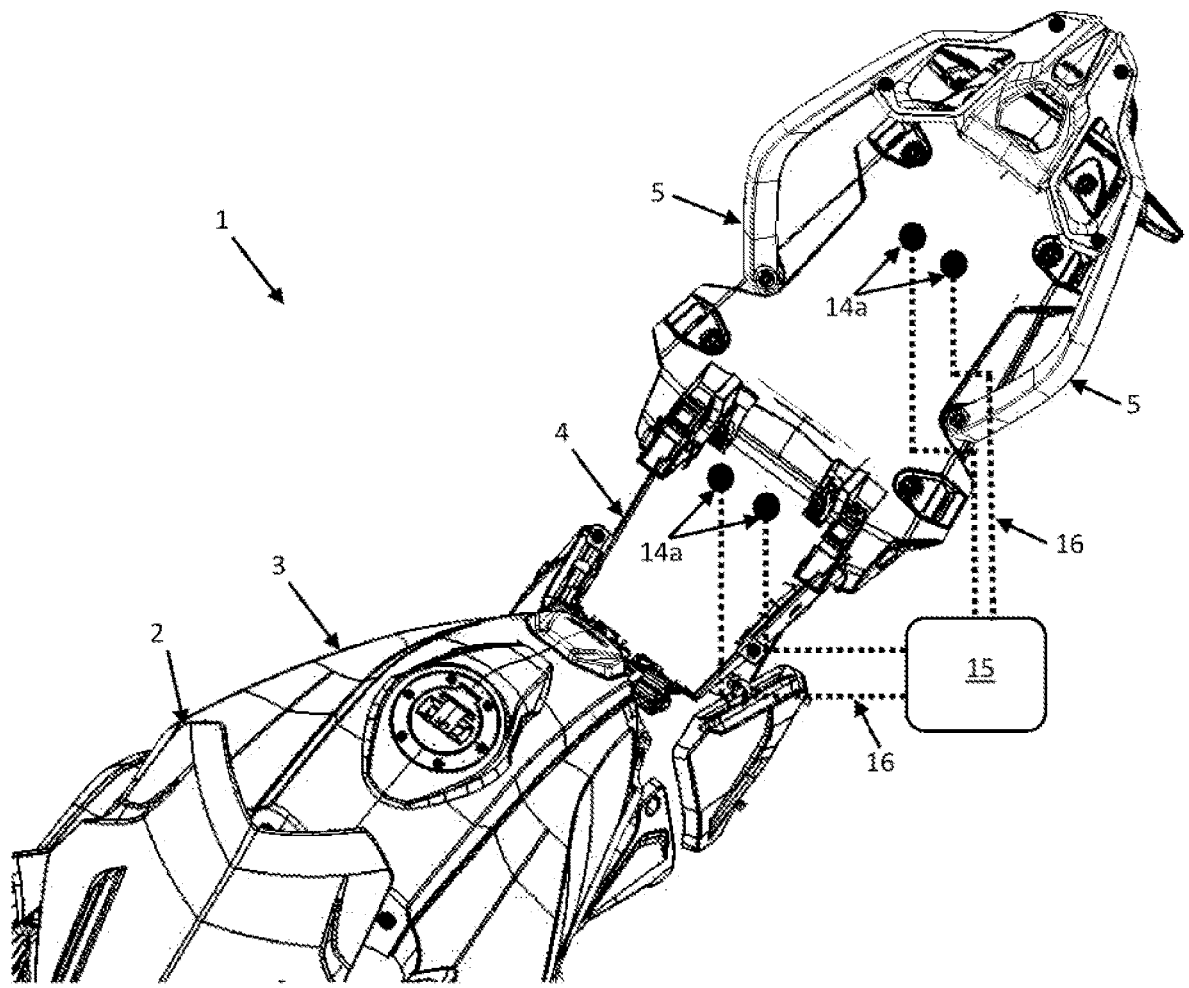
FIG. 1 is a perspective view of a first embodiment of a motorcycle with the seat arrangement removed.

FIG. 1 shows a perspective view of a motorcycle 1 with the seat arrangement 10 taken off. The motorcycle 1 is illustrated by way of example as a motorbike which purely optionally comprises a windshield 2, a fuel tank 3 and a vehicle structure 4. In addition, purely optional grab handles 5 for a pillion passenger are also arranged in a rear region of the vehicle structure 4. Instead of a motorbike, the motorcycle 1 may, however, also be another tilting vehicle or single-track vehicle, such as a motor scooter or scooter, or else a quad bike or trike.

Figure 2:
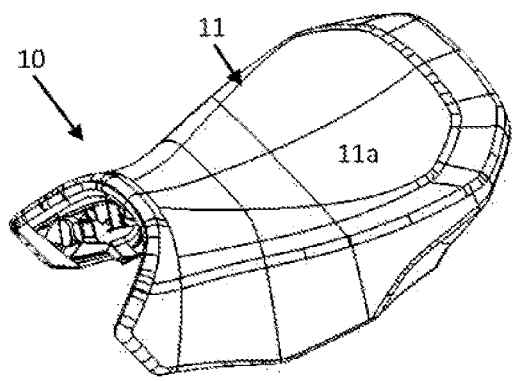
FIG. 2 is a perspective view of a top side of a seat of a seat arrangement for the motorcycle according to FIG. 1.
Figure 3:
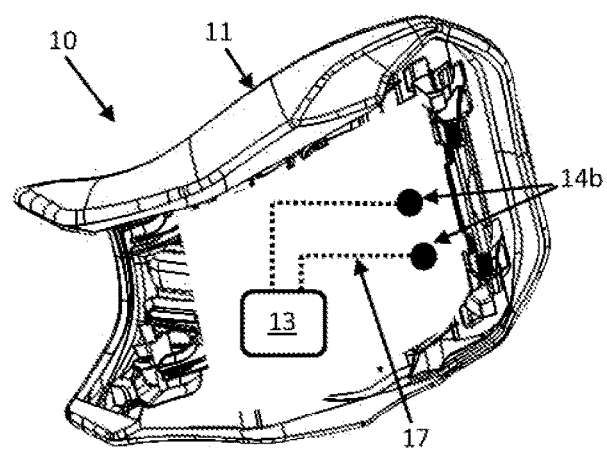
FIG. 3 is a perspective view of an underside of the seat according to FIG. 2.
Figure 4:
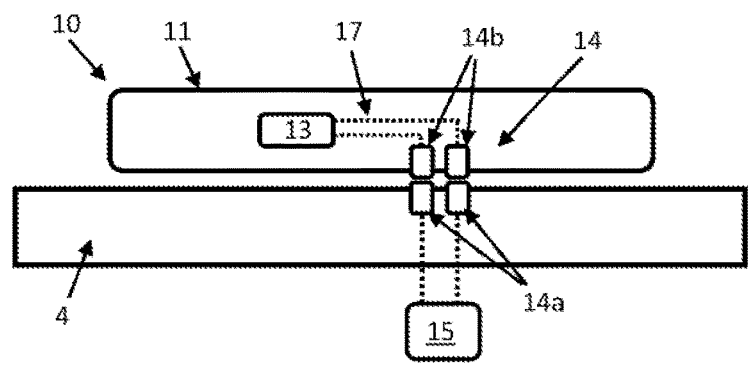
FIG. 4 is a sectional side view of the seat according to FIGS. 2 and 3 in an operating position.

The associated seat arrangement 10 has a two-part form and comprises two (individual) seats 11, a rider's seat and a pillion passenger's seat, which together form the seat arrangement 10. FIGS. 2 to 4 show one of the two seats 11, specifically the rider's seat. The pillion passenger's seat may, however, have an identical structure and possibly differ in terms of the configuration of the seat shape.

Each of the two seats 11 of the seat arrangement 10 forms a seat surface 11a for the rider or the pillion passenger and has an electrically operable device 13. This device is integrated in the respective seat 11 and constitutes an electrically operable consumer which needs to be supplied with electrical energy, in particular electrical current, to operate.

The electrically operable device 13 may for example comprise a heating device for heating the seat surface 11a, that is to say a seat heater. As an alternative or in addition, the electric device may comprise a ventilating device for ventilating the seat surface 11a and/or a cooling device for cooling the seat surface 11a and/or an electrically operable seat adjuster and/or an electrically operable massaging device and/or an electrically operable vibration transmitter for tactile signal generation.

Furthermore, the motorcycle 1 comprises an energy transmission device 14, which is connected to the respective electrically operable device 13 in order to be supplied with electrical energy.

The energy transmission device 14 comprises:
a. a first line section 14a, which is assigned to the vehicle structure 4 and is coupled to an energy source 15, and
b. a second line section 14b, which is assigned to the respective seat 11 of the seat arrangement 10 and is electrically conductively connected to the electrically operable device 13.

Furthermore, the energy transmission device 14 is designed such that the first line section 14a and the second line section 14b are positioned in a transmission position, designed for electrical energy transmission, in relation to one another solely by arranging the seat arrangement 10 in an operating position. FIG. 4 shows a merely schematic illustration of this operating position of the seat arrangement 10, in which the latter is arranged on the vehicle structure 4 of the motorcycle 1. In this case, the first line section 14a and the second line section 14b are arranged in the transmission position, which will be described in more detail below and in which the two line sections 14a, 14b are fastened at mutually facing positions of the vehicle structure 4 and of the seat arrangement 10.

Here, the first line section 14a is electrically conductively connected to the energy source 15 by a current-conducting cable 16 and is integrated in the vehicle structure 4 or mounted fixed to the vehicle underneath the seat arrangement 10.

The second line section 14b is integrated and fastened in the seat 11 of the seat arrangement 10, and electrically conductively connected to the electrically operable device 13 by a current-conducting cable 17.

According to the first embodiment (according to FIGS. 1 to 4), the first line section 14a and the second line section 14b are designed such that the two line sections 14a, 14b in the transmission position are electrically conductively and yet detachably connected to one another. To this end, the first line section 14a is brought into electrically conductive contact with the second line section 14b in detachable fashion. As a result, an electrical current can be provided via the first line section 14a and conducted to the electrically operable device 13 via the second line section 14b in order to operate the electrically operable device.

To this end, the first electric line section 14a has two first contact surfaces 14 which, when the seat arrangement 10 is being arranged in the operating position, are brought into electrically conductive yet detachable contact with two second contact surfaces of the second electric line section 14b. The contact-connection is in this case provided by a detachable application which can be detached or established solely by moving the seat arrangement 10, in order to provide electrical current conduction and thus electrical energy transmission for the purpose of operating the device 13.

In spite of the fixed arrangement of the first line section 14a and the second line section 14b, the first contact surfaces and/or the second contact surfaces may have a movable design in that they are pretensioned in each case by a spring element, in order to subject the respective other contact surface to load by means of the spring force generated. In this way, an improved contact-connection can be ensured.

The second embodiment (according to FIGS. 5 to 7) of the motorcycle 1 described corresponds to the first embodiment (according to FIGS. 1 to 4) except for the energy transmission device 14, and therefore reference is made to the description of the first embodiment, which is also applicable to the second embodiment in the same way. A difference is the specific configuration of the energy transmission device 14, which provides energy transmission by means of induction instead of a direct electrically conductive contact-connection between the first line section 14a and the second line section 14b.

Figure 5:
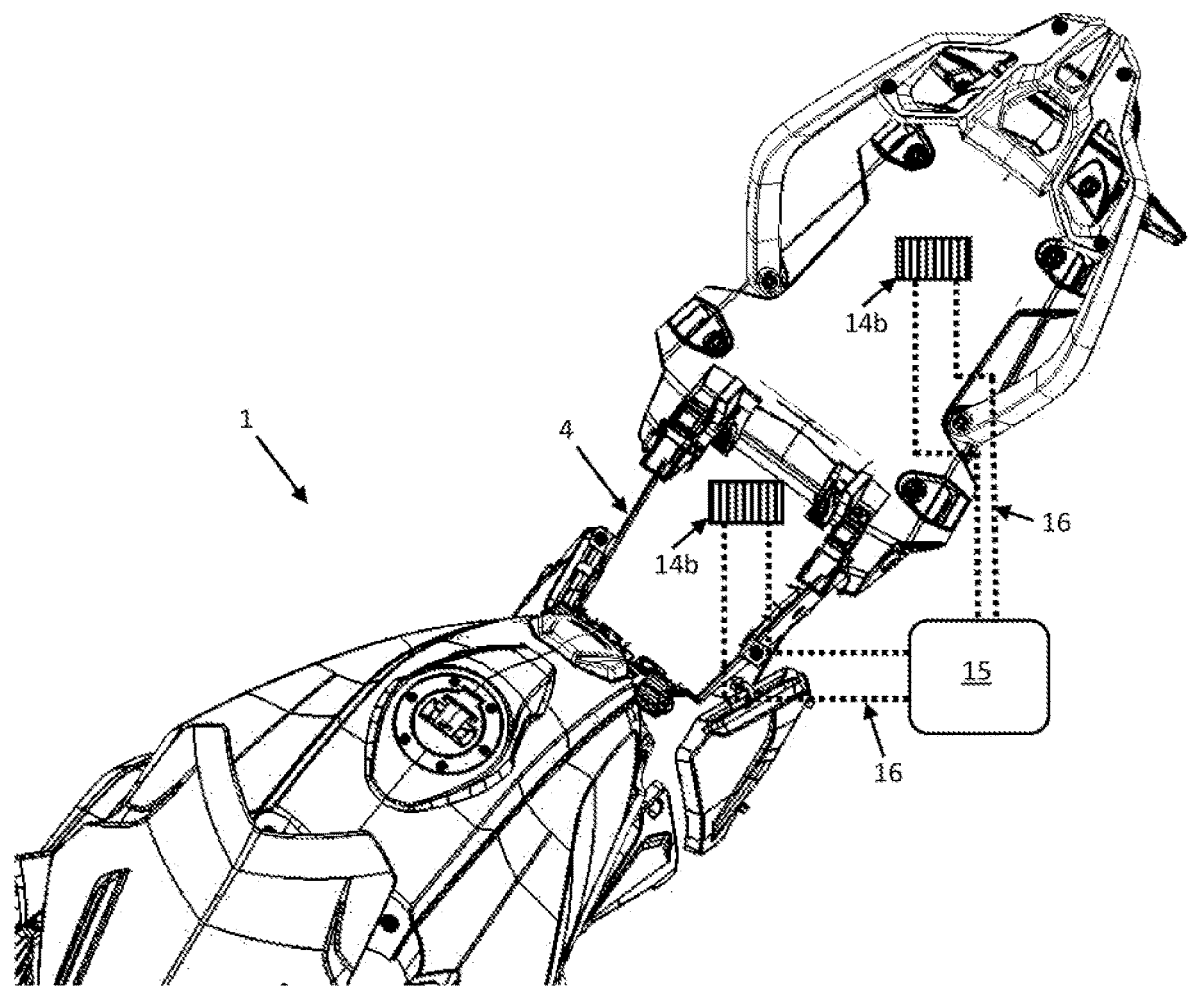
FIG. 5 is a perspective view of a second embodiment of a motorcycle with the seat arrangement removed.
Figure 6:
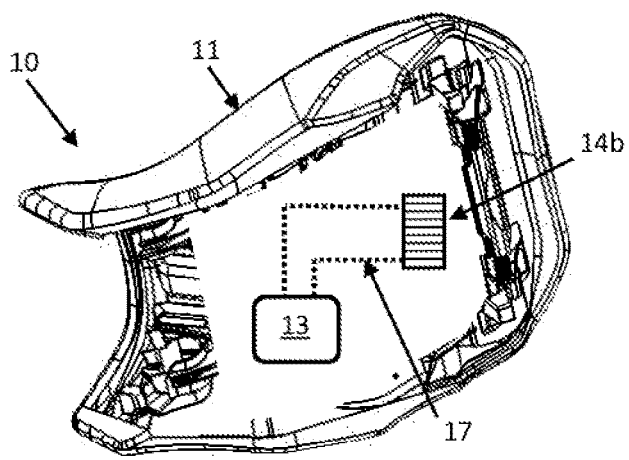
FIG. 6 is a perspective view of an underside of a seat of a seat arrangement for the motorcycle according to FIG. 5.
Figure 7:
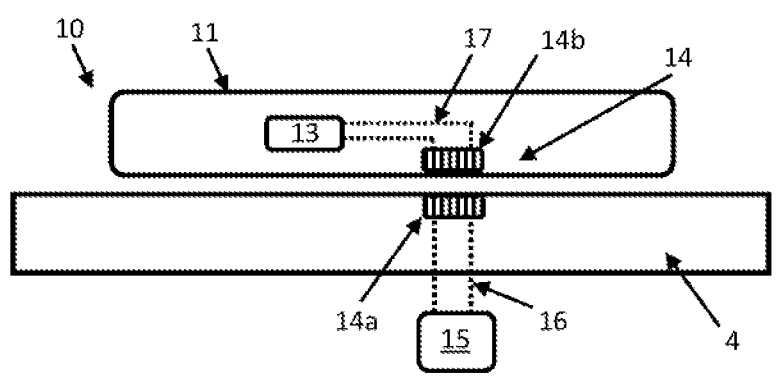
FIG. 7 is a sectional side view of the seat according to FIG. 6 in an operating position.

As illustrated in FIGS. 5 to 7, to this end the first line section 14a and the second line section 14b in the transmission position (according to FIG. 7) may be operatively coupled by means of induction for electrical energy transmission. The two line sections 14a, 14b are arranged adjacently but without direct electrical contact in relation to one another, so that a current flow in the second line section 14b is generated by means of induction, the current flow enabling the operation of the electrically operable device 13.

To this end, the first line section 14a and the second line section 14b each comprise a conductor coil (illustrated merely schematically) for electrical energy transmission by means of induction. For the adjacent arrangement of the two conductor coils, the respective first conductor coil of the first line section 14a is provided in a first position of the vehicle structure 4 facing the seat arrangement 20. Accordingly, the second conductor coil of the second line section 14b is provided in a second position, facing the first position of the vehicle structure 4 and arranged adjoining (or at least adjacent to) the latter, of the vehicle structure 4.

What is claimed is:

1. A motorcycle, comprising:
   a seat arrangement which is completely or at least partially detachable from the motorcycle, the seat arrangement forming a seat surface for a user;
   an electrically operable device of the seat arrangement, the electrically operable device being connected to an energy transmission device in order to be supplied with electrical energy,
   wherein the energy transmission device comprises:
   a. a first line section, which is assigned to a vehicle structure and is couplable to an energy source, and
   b. a second line section, which is assigned to the seat arrangement and is electrically conductively connected to the electrically operable device,
   wherein the energy transmission device is configured such that the first line section and the second line section are positioned in a transmission position, designed for electrical energy transmission, in relation to one another by arranging the seat arrangement in an operating position on the motorcycle,
   wherein the first electric line section has at least one first contact surface, the second electric line section has at least one second contact surface, and arranging the seat arrangement in the operating position causes the at least one first contact surface to make electrical contact with the at least one second contact surface,
   wherein the at least one first contact surface and/or the at least one second contact surface have a movable configuration, wherein the first contact surface is moveable relative to the vehicle structure and/or the second contact surface is moveable relative to the seat arrangement, and the at least one first contact surface and/or the at least one second contact surface are biased by a spring element when moved relative to the vehicle structure and/or the seat arrangement, in order to subject the respective other contact surface to a spring force when the seat arrangement is in the operating position.

2. The motorcycle as claimed in claim 1, wherein the electrically operable device comprises one or more of: a heating device for heating the seat surface, a ventilating device for ventilating the seat surface, or a cooling device for cooling the seat surface.

3. The motorcycle as claimed in claim 1, wherein the first line section and the second line section are electrically conductively and detachably connected to one another in the transmission position.

4. The motorcycle as claimed in claim 1, further comprising:
   a movable cover which partially or completely covers the at least one first contact surface when the seat arrangement is in a position detached from the motorcycle and, when the seat arrangement is being arranged in the operating position, is moved such that the movable cover exposes the at least one first contact surface.

5. The motorcycle as claimed in claim 4, wherein the movable cover is a cover plate or a sliding device.

6. The motorcycle as claimed in claim 1, wherein at least the at least one first contact surface is arranged recessed or has a recessable design with respect to a surrounding edge.

7. The motorcycle as claimed in claim 1, wherein the first line section and the second line section in the transmission position are operatively coupled by induction for electrical energy transmission.

8. The motorcycle as claimed in claim 7, wherein the first line section and the second line section each comprise a conductor loop or a conductor coil for electrical energy transmission via induction.

* * * * *